Figure 1:
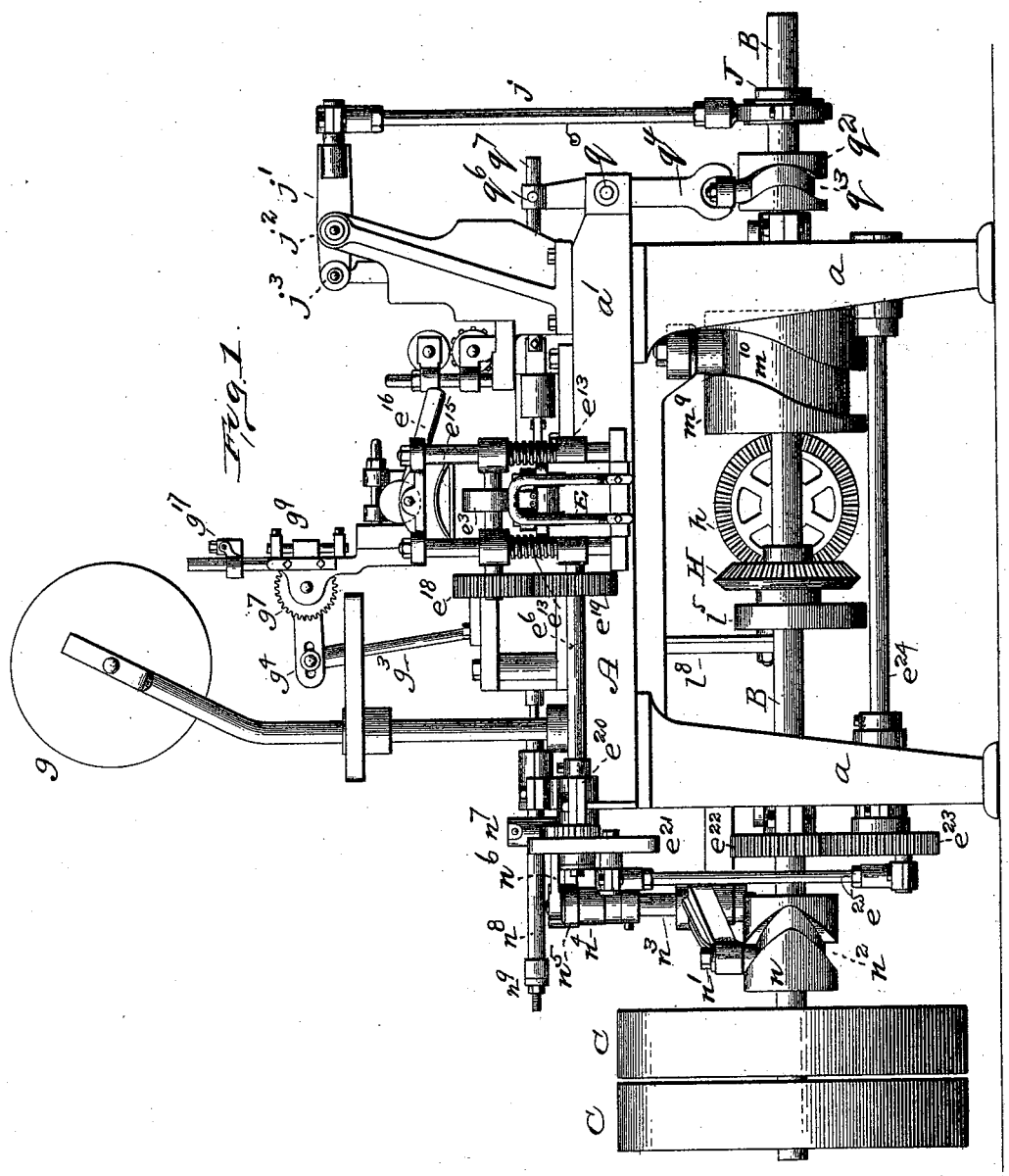

(No Model.) 11 Sheets—Sheet 2.
J. W. GOVIER.
BARB WIRE MACHINE.

No. 498,110. Patented May 23, 1893.

(No Model.) 11 Sheets—Sheet 3.
J. W. GOVIER.
BARB WIRE MACHINE.

No. 498,110. Patented May 23, 1893.

Attest
Edward W. Furrell
A. Bonville

Inventor
John W. Govier
By C D Moody
Atty (No Model.) 11 Sheets—Sheet 4.
J. W. GOVIER.
BARB WIRE MACHINE.
No. 498,110. Patented May 23, 1893.
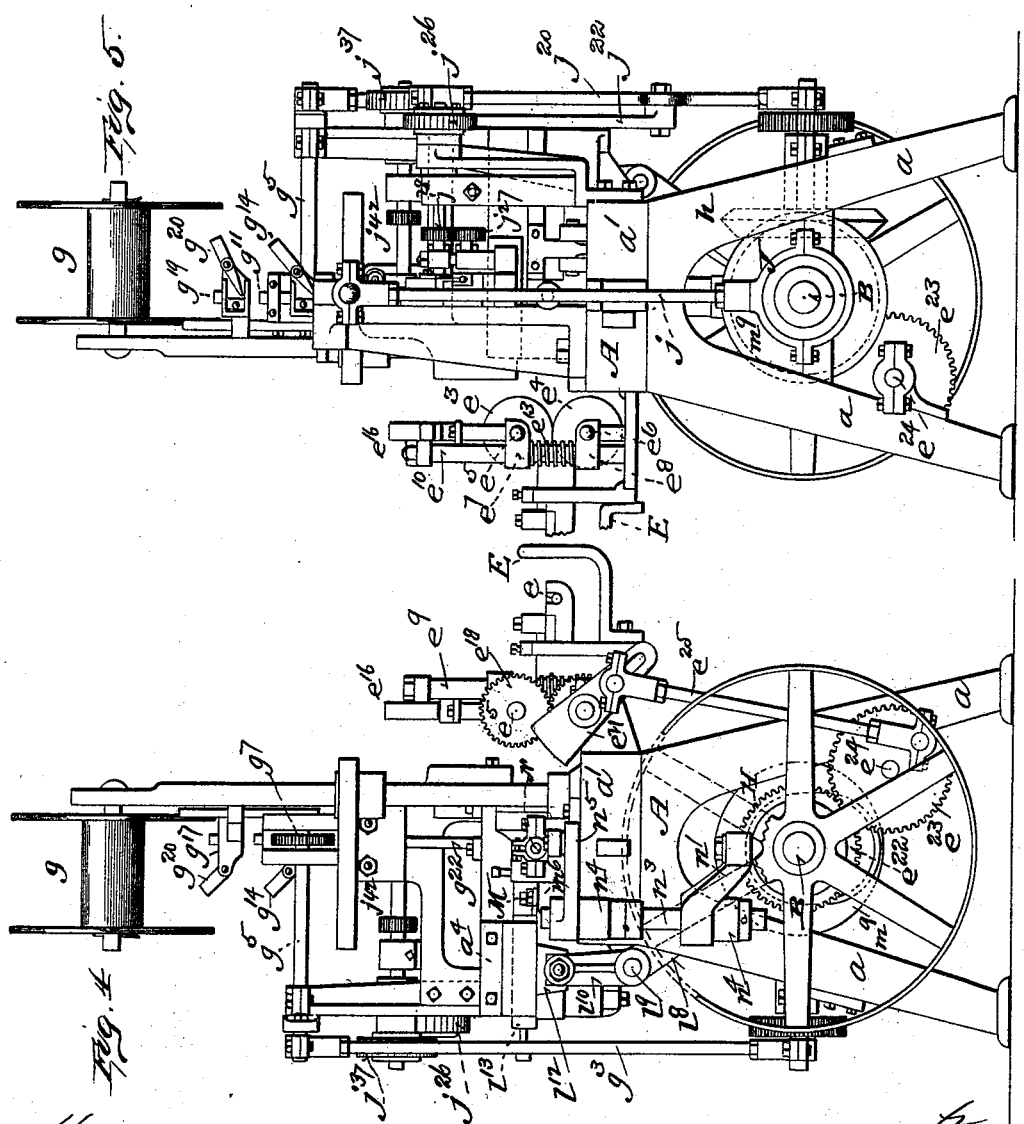

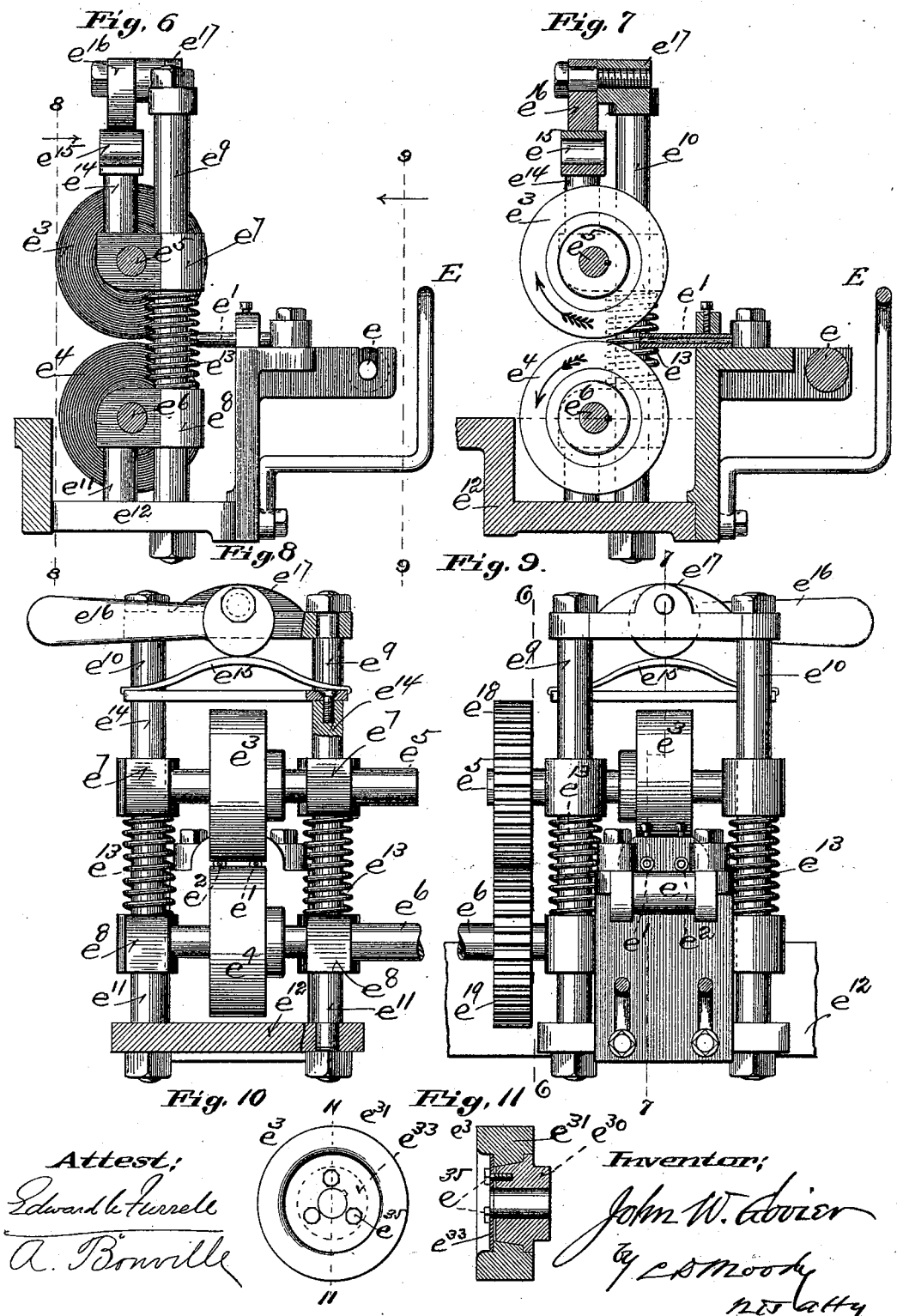

(No Model.)   11 Sheets—Sheet 6.

J. W. GOVIER.
BARB WIRE MACHINE.

No. 498,110.   Patented May 23, 1893.

Attest:
Edward La Furrell
A. Bonville

Inventor:
John W. Govier
by C. D. Moody atty

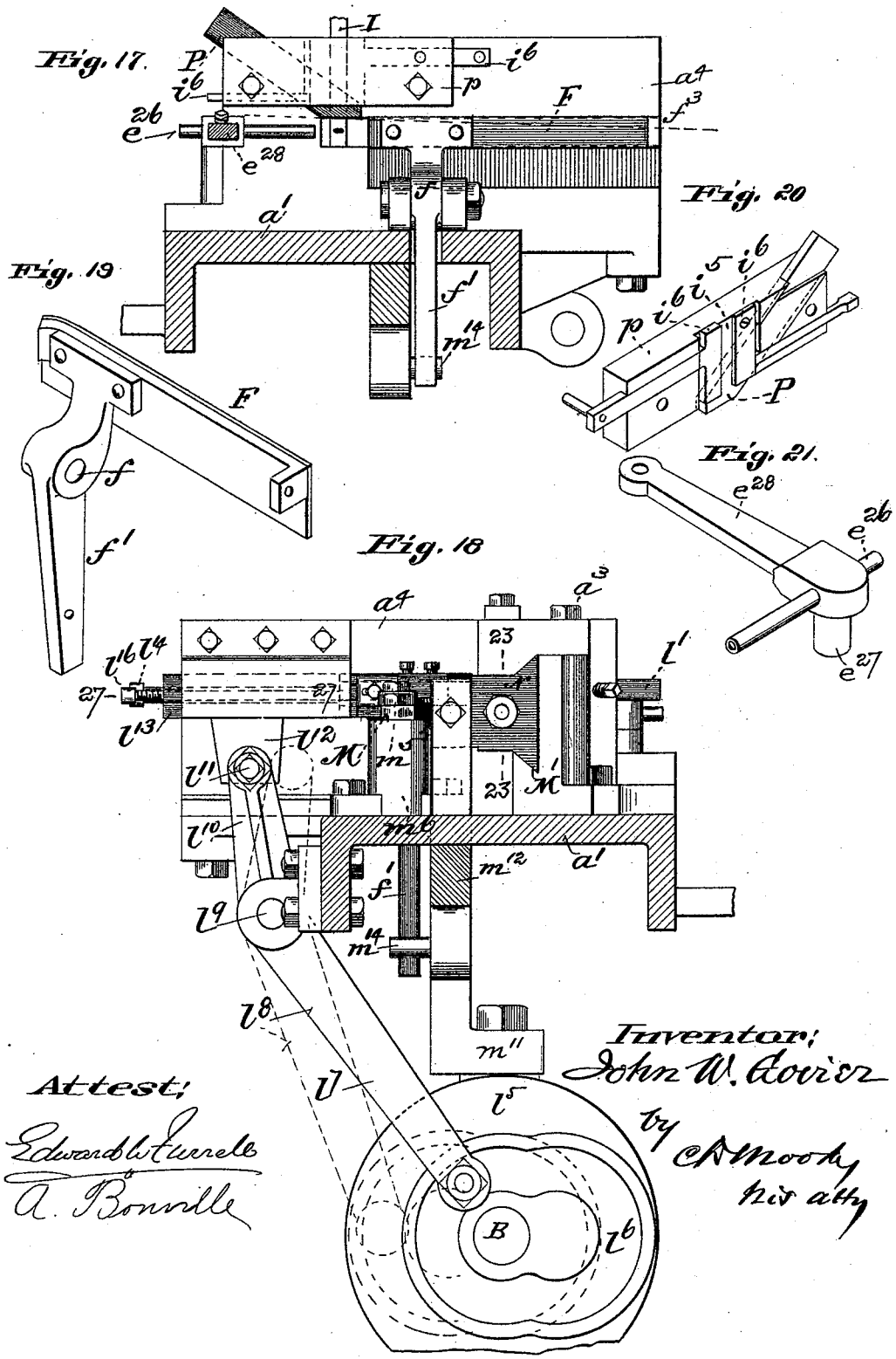

(No Model.) 11 Sheets—Sheet 8.
J. W. GOVIER.
BARB WIRE MACHINE.
No. 498,110. Patented May 23, 1893.
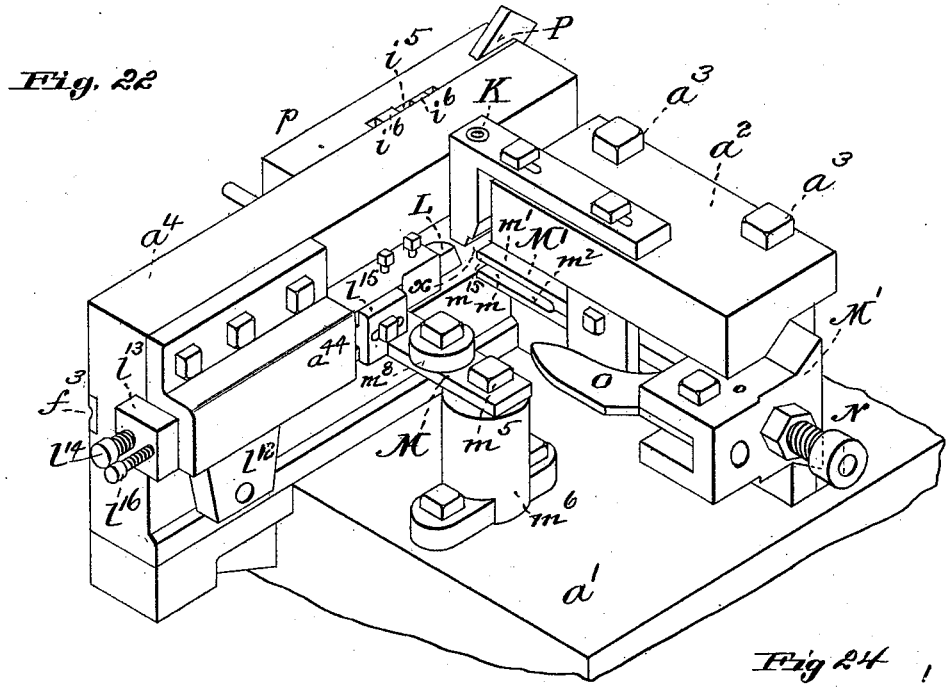
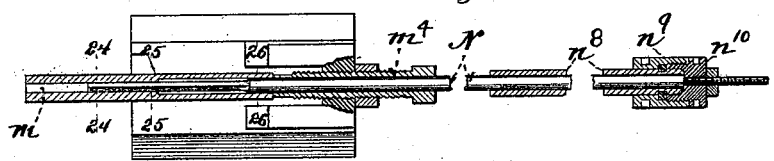
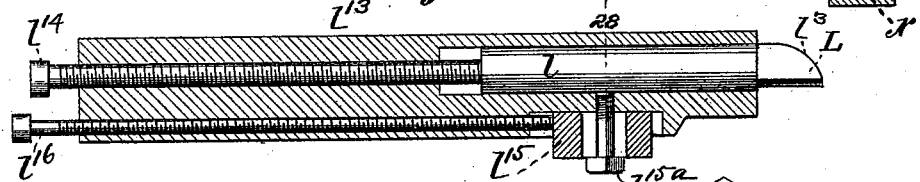
Attest:
Edward W. Furrell
A. Bonville
Inventor:
John W. Govier
by C. D. Moody
atty

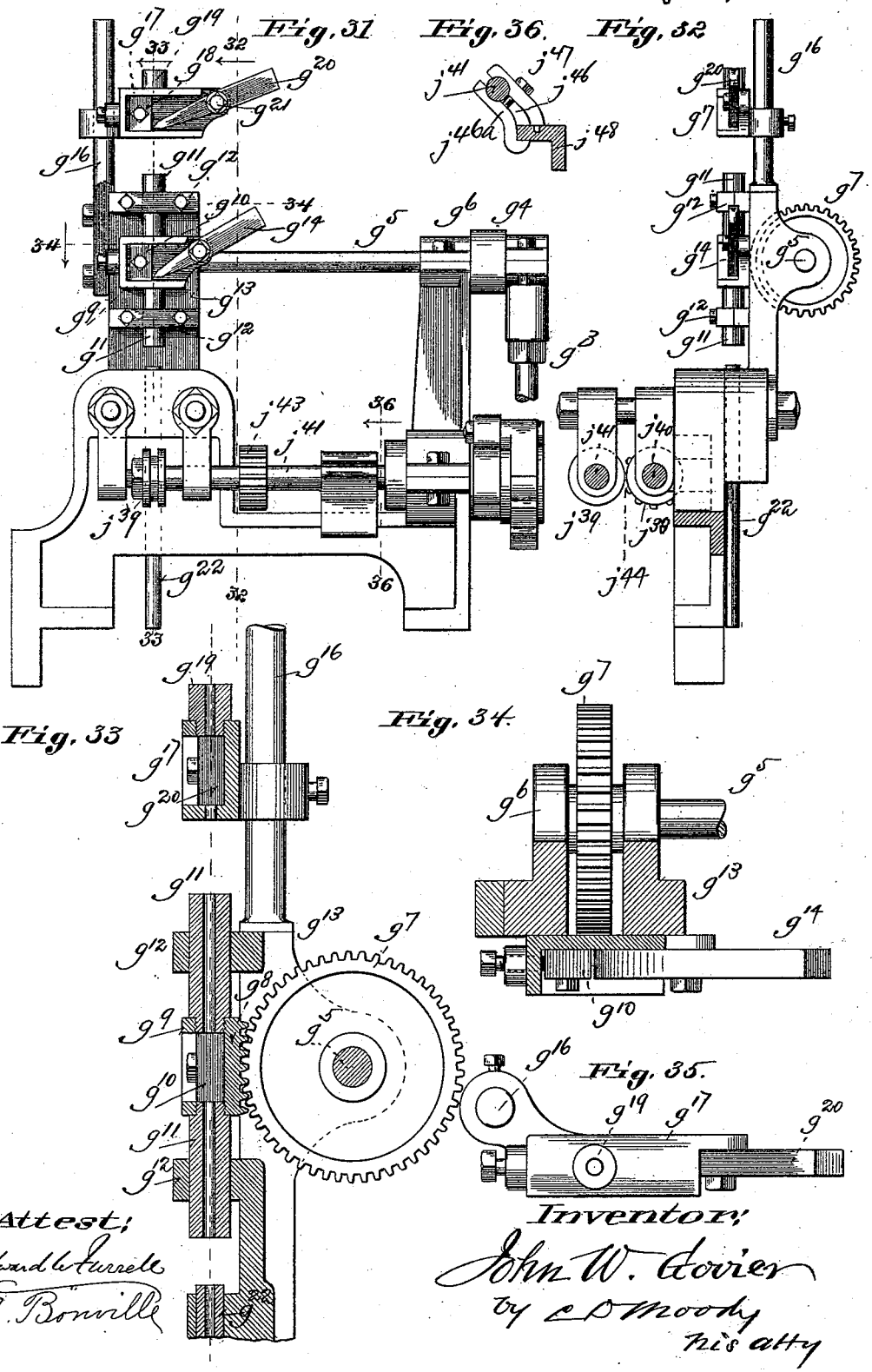

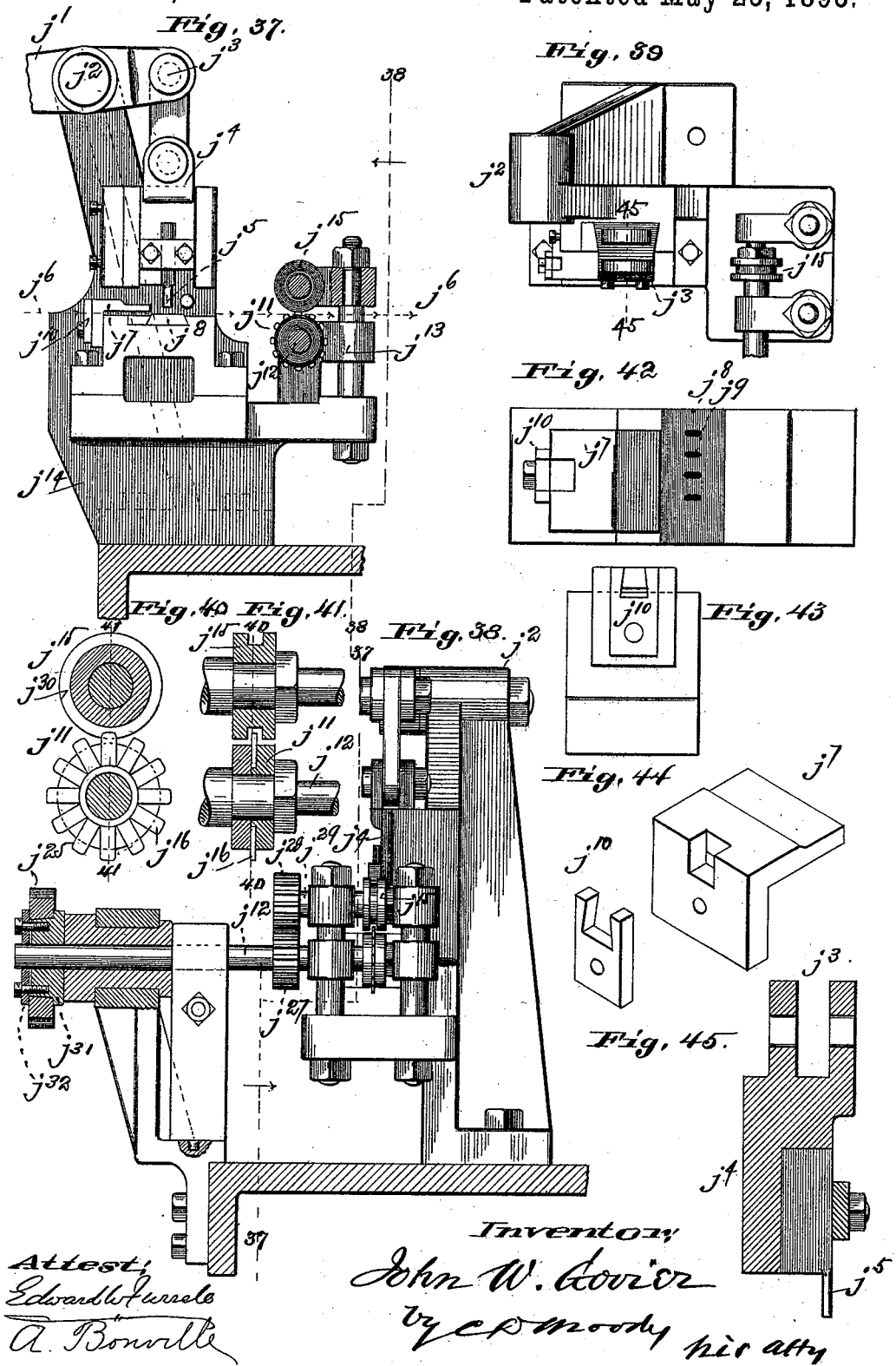

(No Model.)  
11 Sheets—Sheet 11.
J. W. GOVIER.
BARB WIRE MACHINE.
No. 498,110. Patented May 23, 1893.
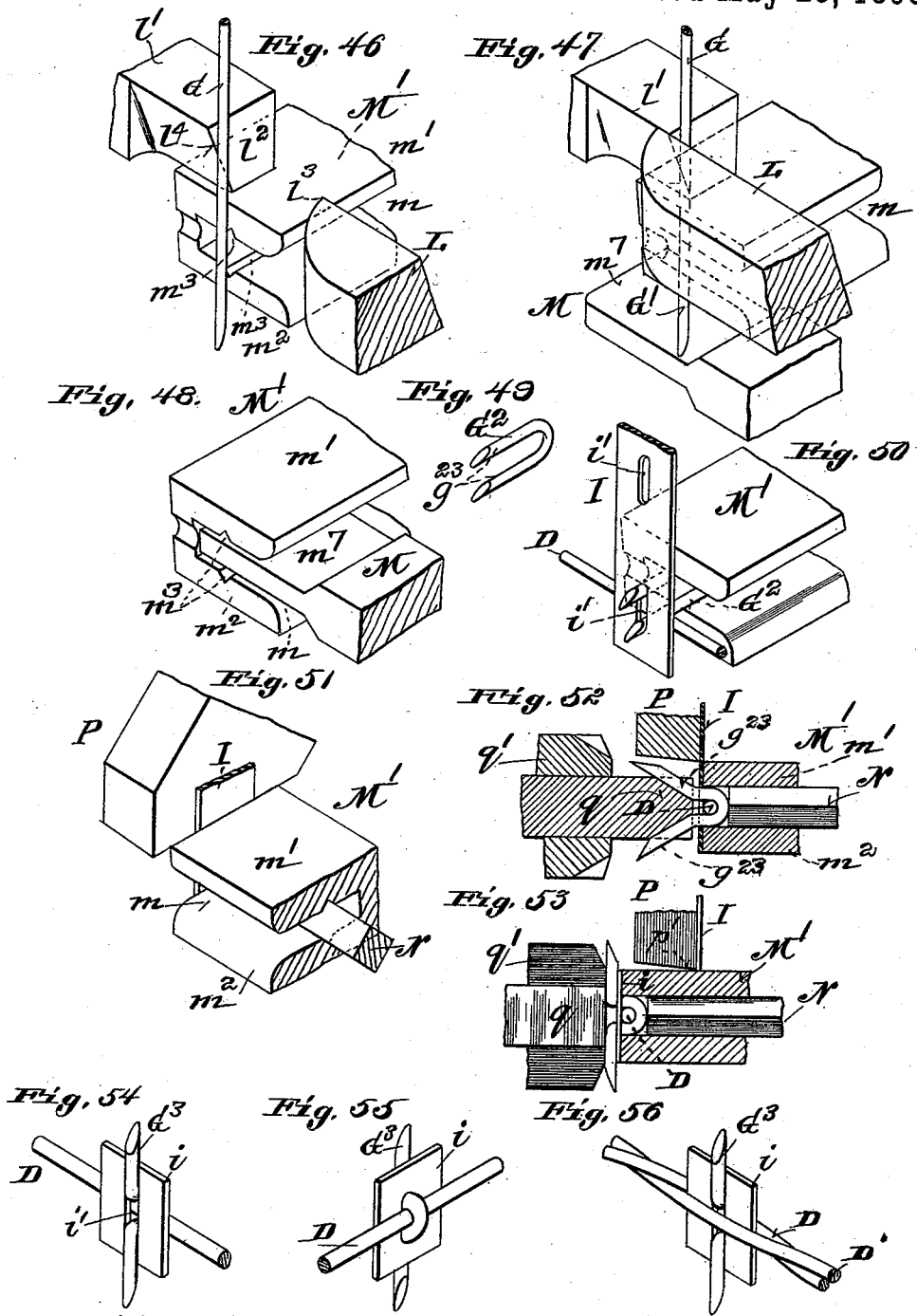
Attest:
Edward W. Furrell
A. Bonville
Inventor:
John W. Govier
by C. W. Moody atty

UNITED STATES PATENT OFFICE.

JOHN W. GOVIER, OF RANKIN, NEAR PITTSBURG, PENNSYLVANIA, ASSIGNOR, BY MESNE ASSIGNMENTS, TO THE DENVER STEEL ROLLING MILL COMPANY, OF DENVER, COLORADO.

BARB-WIRE MACHINE.

SPECIFICATION forming part of Letters Patent No. 498,110, dated May 23, 1893.

Application filed November 8, 1892. Serial No. 451,355. (No model.) Patented in Canada September 28, 1888, No. 29,923.

*To all whom it may concern:*

Be it known that I, JOHN W. GOVIER, of Rankin, near Pittsburg, Pennsylvania, have made a new and useful Improvement in Barb-Wire Machines, (heretofore in part patented in Canada September 28, 1888, No. 29,923,) of which the following is a full, clear, and exact description.

The machine herein described, constituting the subject matter of the present application, is for making a form of barbed wire whose distinguishing feature is a shoulder or shield which serves to limit the action of the barb, and, incidentally, to render the wire more conspicuous. Besides the barbs and the shoulders referred to, two strand wires are usually employed, although a single strand may be used. The strand wires are fed across the machine; the strip from which the shields are formed, and the wire from which the barbs are cut, are fed to meet, at opposite sides thereof respectively, that one of the strand wires to which the barbs are applied; at each desired interval in the length of the strand wire a shield-length and a coacting barb-length are cut from the strip and the barb wire respectively, and jointly applied to the strand wire; the other strand wire subsequently meets the one to which the barbs and shields have been applied, and the two strand wires are intertwined, forming what is known upon the market as safety barb wire, and the improvement consists in various combinations of parts whereby unitary results, as well as the final result, are obtained, all substantially as is hereinafter set forth and claimed, aided by the annexed drawings, making part of this specification, in which—

Figure 2:
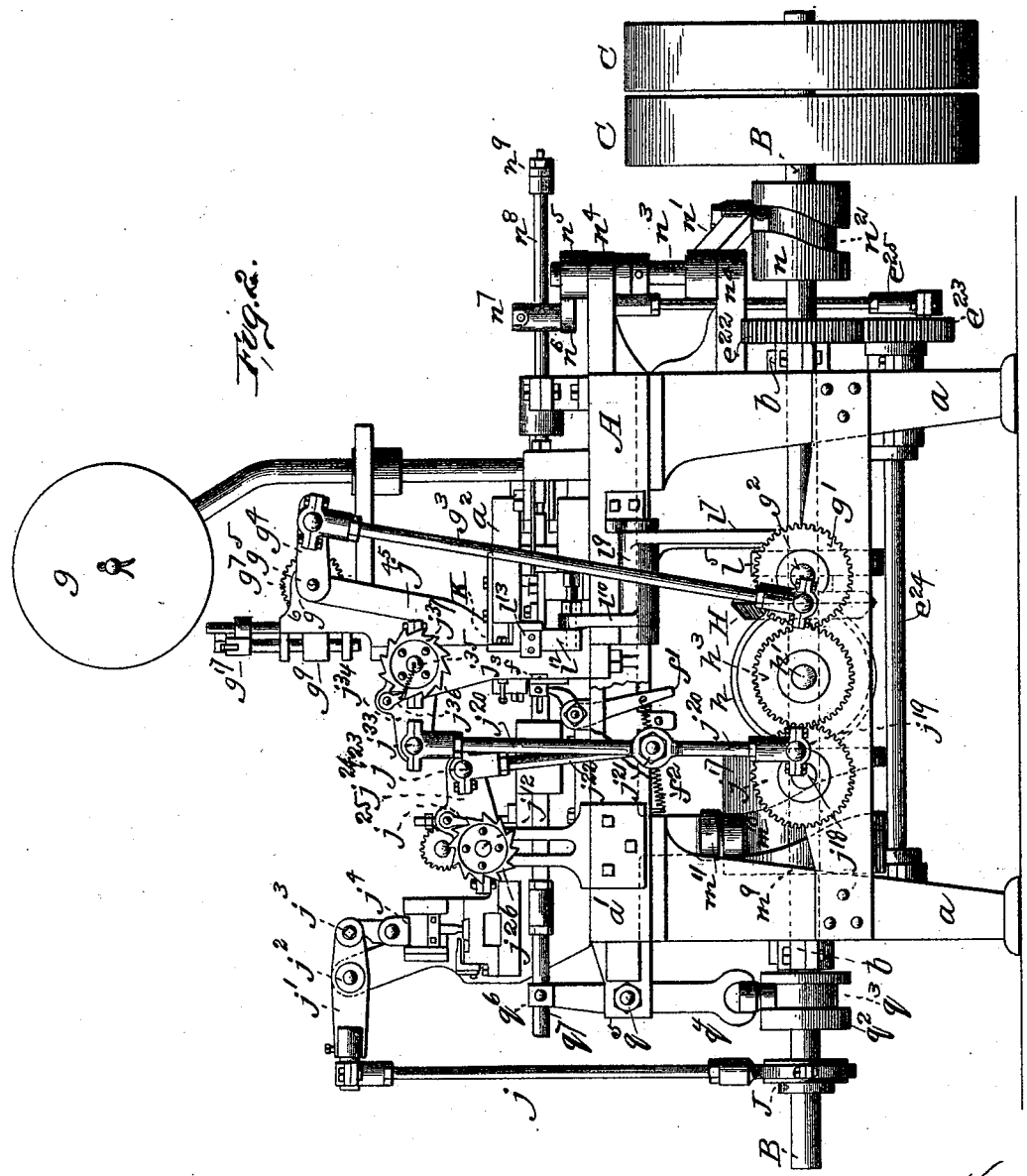
Figure 3:
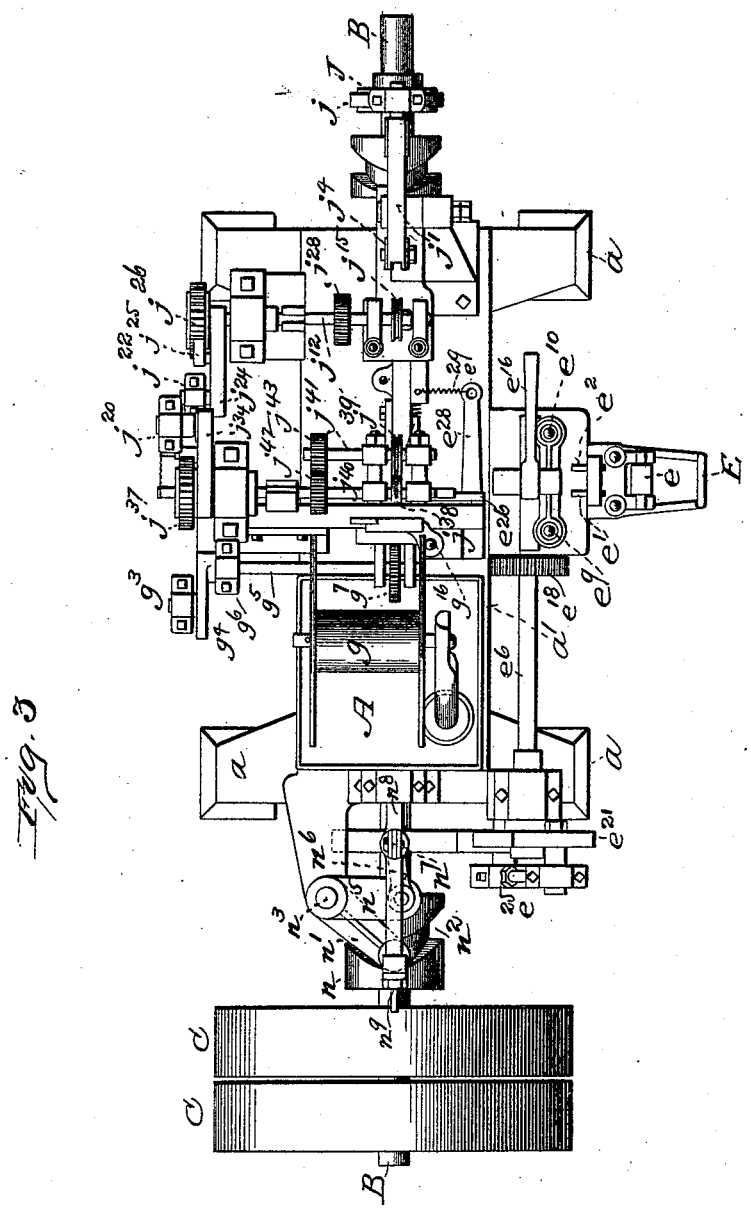
Figure 12:
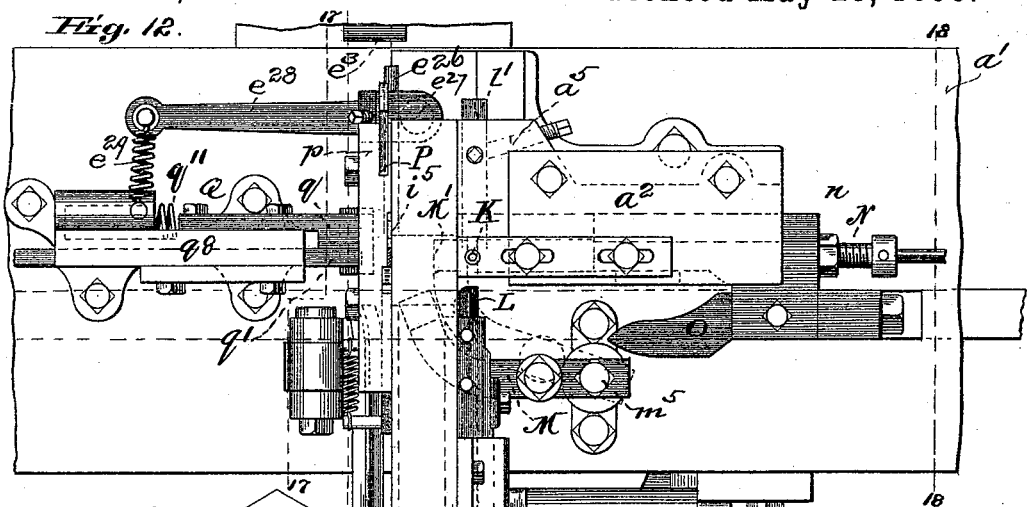
Figure 14:
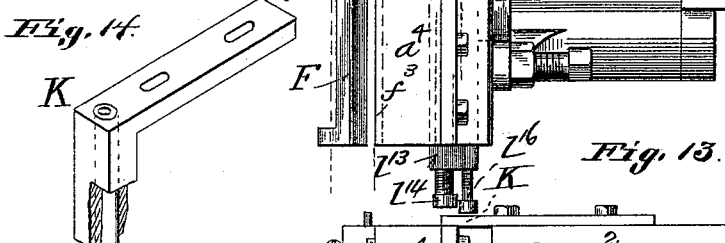
Figure 13:
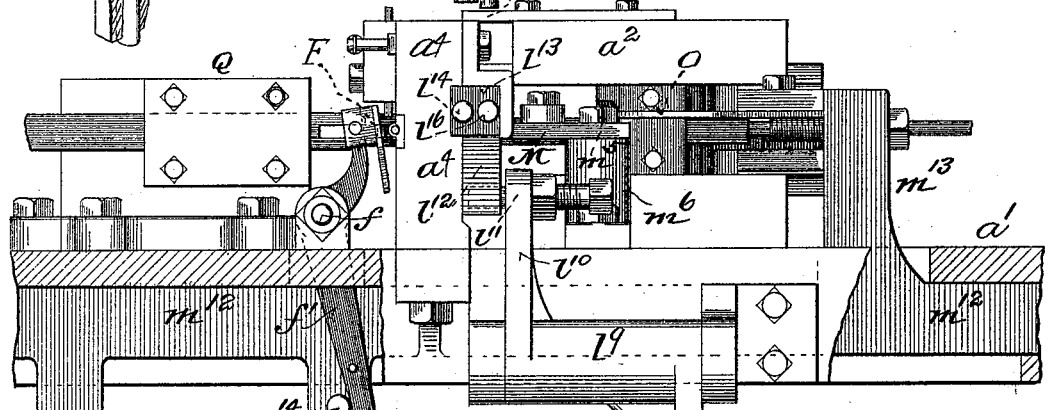
Figure 15:
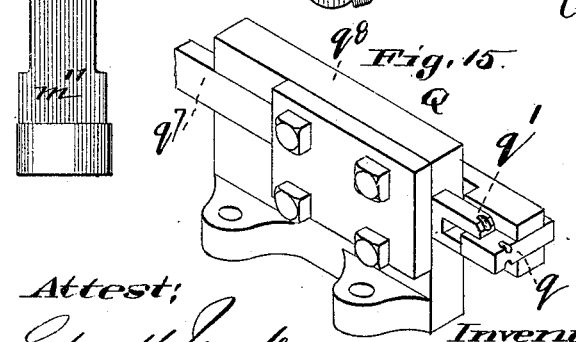
Figure 16:
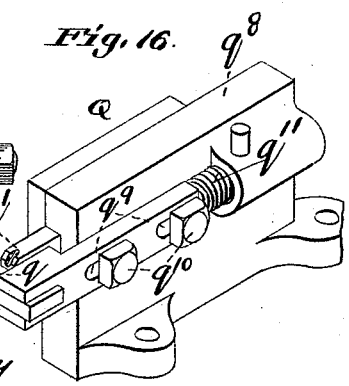

Figure 1 is a side elevation of the machine in question; Fig. 2 an elevation of the side of the machine which is opposite to that shown in Fig. 1; Fig. 3 a plan of the machine; Fig. 4 an end elevation of the machine; Fig. 5 an elevation of the opposite end of the machine; Fig. 6 a vertical transverse section, on the line 6—6 of Fig. 9 of the strand wires feed mechanism; Fig. 7 a vertical transverse section on the line 7—7 of Fig. 9; Fig. 8 a vertical longitudinal section on the line 8—8 of 6; Fig. 9 a vertical longitudinal section on the 9—9 of Fig. 6; Fig. 10 a side elevation of one of the strand wires feed rolls; Fig. 11 a section on the line 11—11 of Fig. 10; Fig. 12 a detail plan of the barb-forming mechanism; Fig. 13 a detail side elevation of the parts of Fig. 12, a portion of the bed plate broken away; Fig. 14 a view in perspective, partly broken away, of the barb-wire guide; Fig. 15 a view in perspective of the barb spreading and clinching device; Fig. 16 a view in perspective, from another point of view, of the barb spreading and clinching device; Fig. 17 a detail transverse vertical section on the line 17—17 of Fig. 12, showing the device for holding the strand wires and for holding the knife used to cut off the the shields; Fig. 18 a detail transverse vertical section, on the line 18—18 of Fig. 12, of the barb-forming mechanism; Fig. 19 a view in perspective of the strand holding device, in part; Fig. 20 a detail perspective view of the shields - guide and knife; Fig. 21 a detail perspective view of the guide for that one of the strand wires to which the barbs are applied; Fig. 22 a detail perspective view of the barb - forming mechanism; Fig. 23 a detail vertical longitudinal section on the line 23—23 of Fig. 18, showing the staple-forming and discharging device; Fig. 24 a section on the line 24—24 of Fig. 23; Fig. 25 a section on the line 25—25 of Fig. 23; Fig. 26 a section on the line 26—26 of Fig. 23; Fig. 27 a horizontal section on the line 27—27 of Fig. 18 and also of Fig. 28, showing the device for adjusting one of the knives used in cutting the barb - lengths from the barb wire; Fig. 28 a vertical transverse section on the line 28—28 of Fig. 27; Fig. 29 a view in perspective of the male part of the device used in forming the staple which ultimately forms the barb; Fig. 30 a view in perspective of the female part of the device just mentioned; Fig. 31 an elevation of the barb-wire feeding mechanism; Fig. 32 a vertical transverse section on the line 32—32 of Fig. 31; Fig. 33 a vertical transverse section on the line 33—33 of Fig. 31; Fig. 34 a horizontal section on the line 34—34 of Fig. 31; Fig. 35 a plan of the upper holding dog of the barb wire feeding mechanism; Fig. 36 a vertical transverse section on the line 36—36 of Fig. 31, showing the tension or retarding device for the shields-strip feeding shaft; Fig. 37 a vertical longitudinal section on the line 37—37 of Fig. 38, showing the mechanism for feeding and punching the shields-strip; Fig. 38 a vertical transverse section, on the line 38—38 of Fig. 37, showing the means for feeding the shields strip; Fig. 39 a plan of the parts of Fig. 37, the operating lever being removed; Fig. 40 a vertical transverse section on the line 40—40 of Fig. 41, showing the device for feeding the shields strip; Fig. 41 a vertical longitudinal section on the line 41—41 of Fig. 40; Fig. 42 a plan of the shields-strip punching die; Fig. 43 an end elevation of the die just mentioned; Fig. 44 a view in perspective of the shields-strip guides, separated; Fig. 45 a vertical section, on the line 45—45 of Fig. 39, of the shields-strip punch and punch-head; Fig. 46 a view in perspective showing the wire from which the barb-lengths are cut, the knives for cutting same and the female part of the staple former; the parts are relatively arranged as when at rest; Fig. 47 a view in perspective of the parts shown in Fig. 46 with the addition of the male part of the staple-former, the movable knife being moved to cut the barb-length off, and said male part in position to initiate the forming of the staple; Fig. 48 a view in perspective showing the parts of the staple-former as when the staple is completed; Fig. 49 a view in perspective of the staple; Fig. 50 a view in perspective showing the staple partly ejected from the staple-former, the strand-wire, and a portion of the shields-strip, the staple being inserted part way through the slot in the strip; Fig. 51 a view in perspective showing the shields-strip, the female part of the staple-former, the staple-ejector, and the shields-strip knife, said knife in position to form a shoulder behind the strip; Fig. 52 a longitudinal section showing the female part of the staple-former, the staple-ejector, the staple, the strand wire to which the staples are applied, the shields-strip, the shield knife, and the staple-expanding and clinching device, the staple being around the strand wire and projecting through the shields-strip, and the staple being expanded but not yet clinched; Fig. 53 a view analogous to that of Fig. 52, but showing the staple expanded and clinched, and the parts employed in that operation accordingly adjusted; Fig. 54 a view in perspective of the barb and shield applied to the strand wire; Fig. 55 a view in perspective, from another point of view, of the parts of Fig. 54; and Fig. 56 a view in perspective showing the barb and shield applied to the strand wire and the other one of the strand wires intertwisted therewith.

The views are not all upon the same scale.

The same characters of reference denote the same parts.

A represents a suitable frame for the working parts of the machine. Its principal parts are the legs $a$, $a$, and the bed plate $a'$, substantially as shown.

B represents the driving shaft of the machine. It is arranged longitudinally in the machine, below the bed-plate, and is journaled in suitable bearings $b$. The shaft is provided with suitable pulleys C C, to enable motion to be imparted to it from any suitable motor, and it is furnished with various cams and other parts wherewith the shaft-motion is transmitted variously, and in various directions, for accomplishing the work of the machine.

*The strand-wires.*—The mechanism for feeding the strand wires, D and D', appears in Figs. 1, 3, 4, and 5, and, more in detail, in Figs. 6 and 9. The wires are fed through an outer guide E, thence over a roller $e$, thence, and respectively, through the tubes $e'$, $e^2$, and thence between the feed rollers $e^3$, $e^4$, which serve to draw the wires into the machine and to deliver them to the barb forming mechanism. The feed rollers are attached respectively to the shafts $e^5$, $e^6$. To enable the rollers to obtain and maintain the proper grip upon the strand wires the shafts, $e^5$, $e^6$, are held in arms $e^7$, $e^8$, respectively, and these arms in turn are attached to the standards $e^9$, $e^{10}$; the lower arms by means of the posts, $e^{11}$, rest upon the base plate $e^{12}$; springs $e^{13}$ encircle the standards between the arms, substantially as shown; the upper arms, $e^7$, support posts $e^{14}$; a spring $e^{15}$ rests and bears upon the posts, and $e^{16}$ represents a cam lever journaled in a bearing $e^{17}$ supported upon the standards $e^9$, $e^{10}$, and by suitably operating it the pressure is brought to bear, through the spring $e^{15}$, posts $e^{14}$, and arms $e^7$, upon the upper roller and the same can thereby be depressed to bear upon the strand wires as may be desired. By releasing the cam-lever pressure the springs $e^{13}$ act to lift the upper roller and in this way the desired pressure is secured upon the strand wires.

To operate the feed rollers the shafts, $e^5$, $e^6$, are respectively provided with the gears $e^{18}$, $e^{19}$, which engage with each other and the shaft $e^6$ is extended and journaled in a bearing $e^{20}$, and is provided with a crank arm $e^{21}$; the shaft B is provided with a gear wheel $e^{22}$ which engages with the gear wheel $e^{23}$ upon a countershaft $e^{24}$. Said last named gear also serves as a crank, and its motion, by means of the pitman $e^{25}$, is transmitted to the crank arm $e^{21}$, and thus the motion of the shaft B is enabled to effect the operation of the feed rolls $e^3$, $e^4$, for the purpose described. That strand wire, D, to which the barb and shields are attached, after passing the feed rolls is led through a guide, $e^{26}$, (Figs. 12, 17, and 21,) and thence past the point at which the barbs and shields are applied. A jaw, F, (see Figs. 17, 19, 13, 12, and 2,) which is pivoted at $f$, and provided with an arm $f'$, and which is, as hereinafter described, drawn by a spring $f^2$, serves to clamp the strand wire D against a bearing $f^3$, and thus to hold the strand wire during each application of a barb and shield. The guide $e^{26}$, is attached to a pivot $e^{27}$, which is journaled in the framework of the machine, and is provided with an arm $e^{28}$ which is elastically held by a spring $e^{29}$, as shown, to enable the guide to accommodate itself to any lateral strain upon the wire.

*The barb-wire.*—The wire, G, from which the barbs are made, is fed from some suitable point, such as the reel $g$, Figs. 1, 2, 3, 4, and 5, and by means of the mechanism shown in a detailed form in Figs. 31 to 36, and, more generally, in Figs. 1, 2, 4 and 5. The main shaft B is provided with a bevel gear, H, which engages with a bevel gear $h$, that is attached to a shaft, $h'$, arranged crosswise in the machine and journaled in a suitable bearing $h^2$, in the frame of the machine, substantially as shown, and provided with a gear wheel $h^3$. This last named gear wheel engages with a gear wheel $g'$ which is journaled upon a shaft $g^2$; the wheel, $g'$, serves as a crank, and its motion, by means of the pitman $g^3$, is transmitted to an arm $g^4$ which is fastened to a shaft, $g^5$, journaled in a bearing $g^6$, and provided with a gear wheel $g^7$. This last named part engages with a rack $g^8$ which in turn is attached to or made part of a movable frame $g^9$. The motion of the pitman $g^3$, the arm $g^4$, and the gear wheel, $g^7$, is a reciprocating one, and in consequence the motion of the frame $g^9$ is similar, the frame moving toward and from the point at which the barbs are formed. The frame, $g^9$, carries the shoulder $g^{10}$, and it is provided with the tubular arms $g^{11}$, which serve, by working through the lugs $g^{12}$, upon the stationary part $g^{13}$, to support and guide the frame in its movement and also to guide the barb wire. The frame also is provided with the dog $g^{14}$, which is pivoted to the frame $g^{15}$. An extension $g^{16}$, of the part $g^{13}$ serves to support another frame $g^{17}$ which is analogous to the frame $g^9$, but which is stationary; that is, it is provided with the shoulder $g^{18}$, the tubular guide $g^{19}$ and the dog $g^{20}$ pivoted at $g^{21}$. The action of this part of the device is substantially as follows: The motion of the shaft B, being communicated in the manner described to the frame $g^9$, that part moves upward and downward in its support and, by reason of the dog $g^{14}$, which is suitably adjusted therefor, pressing the barb wire against the shoulder $g^{10}$, the wire is carried with the frame in its movement toward the barb forming mechanism and in such downward movement the wire is drawn through the tube $g^{19}$ and past the dog $g^{20}$. On the reverse or up stroke of the frame $g^9$ the dog $g^{20}$ acts to bind the wire and prevent it from slipping backward. At the same time it does not act to keep the wire from being fed downward. The wire after leaving the frame $g^9$ passes through another guide $g^{22}$ and thence, through an eyelet, K, Figs. 12, 22, to the point at which the barbs are formed.

*The shields-strip.*—This strip, I, is of suitable width and thickness to form what is termed a shield, $i$, of the size and shape indicated substantially in Figs. 54 to 56. It is slotted at $i'$ to receive the barb. The strip is punched and delivered to the point at which the barbs and shields are applied to the strand wire in the following manner: The strip is fed, from any suitable point to mechanism for punching the slots $i'$, and thence it passes to the barb-forming mechanism. J represents an eccentric attached to the main shaft B and serving, in the rotation of the shaft, to operate the strap $j$ which, in turn, is jointed to a lever $j'$ that is pivoted at $j^2$, and, at $j^3$, jointed to the punch-head $j^4$. The details of the mechanism immediately under consideration appear more distinctly in Figs. 37 to 45. The punch-head carries the punch $j^5$. The strip is fed beneath the punch as indicated by the arrows $j^6$, Fig. 37, and in such movement is carried beneath a keeper $j^7$, and over the bed plate, $j^8$, or die, of the punching mechanism. This last named part has one or more perforations $j^9$, of suitable size and shape to receive the punch as it is moved downward to produce the slot in the strip. There is a series of perforations, $j^9$, in the bed plate to enable any one of the perforations to be brought into line with the punch. A wear-plate, $j^{10}$, serves to guide the strip beneath the keeper. The described oscillation of the strap $j$ and the lever $j'$ imparts the desired reciprocating movement of the punch, and the slots $i'$ are thereby formed therein.

The strip is fed along as follows: $j^{11}$ represents a feed wheel which in its general construction resembles a sprocket wheel. It is fastened to a shaft $j^{12}$ that is conveniently journaled in an arm, $j^{13}$, upon the standard $j^{14}$ which supports the punching-mechanism just described. An overhead roll $j^{15}$, coacts with the wheel $j^{11}$, the strip being fed between said wheel and roll the projections $j^{16}$ of the wheel engaging in the slots $i'$ in the strip.

Motion is imparted to the wheel $j^{11}$ as follows: $j^{17}$ represents a gear wheel mounted upon the shaft $j^{18}$, which is journaled in suitable bearings in the frame work of the machine, substantially as shown. This gear is in engagement with and is driven by the gear wheel $h^3$, and it is provided with a wrist-pin $j^{19}$ to which a pitman $j^{20}$ is connected. This pitman is jointed at $j^{21}$ to a branch-pitman, $j^{22}$, which in turn is at $j^{23}$, jointed to an arm $j^{24}$; this last named arm is journaled upon the shaft $j^{12}$ and is provided with a dog $j^{25}$, which coacts with the ratchet $j^{26}$ fastened to said shaft $j^{12}$; said shaft is provided with the pinion $j^{27}$ which engages with another pinion $j^{28}$ upon the shaft $j^{29}$ which carries the wheel $j^{15}$. Said wheel $j^{15}$, is grooved at $j^{30}$ to admit the points $j^{16}$ of the feed-wheel. The reciprocating motion of the pitmen $j^{20}$, $j^{22}$, therefore produces the desired rotation of the feed wheel and roll, $j^{11}$, $j^{15}$. The ratchet, $j^{25}$, is conveniently attached in position by means of the conical hub $j^{31}$, and the fastening plate $j^{32}$, said hub being fastened, in any suitable manner to the shaft $j^{26}$ and having a conical periphery, and with the ratchet fitted to said periphery, and the fastening plate encircling said shaft and lapping upon said ratchet and being fastened to said hub by screws, substantially as shown.

The strip, in the present instance, needs to be turned downward to meet the strand wires. Accordingly the main pitman $j^{20}$, is extended upward and, at $j^{33}$, is jointed to an arm $j^{34}$ which is journaled upon the shaft, $j^{35}$, and is provided with a dog $j^{36}$, which coacts with the ratchet $j^{37}$ which is fast to the shaft $j^{35}$. Said last named shaft is provided with a wheel $j^{38}$, Fig. 3, which, in conjunction with the grooved wheel $j^{39}$, the shafts $j^{40}$, $j^{41}$, and the pinions $j^{42}$, $j^{43}$, and in manner analogous to the strip-feeding mechanism just described, serves to feed the strip farther along and in the direction described. This last described direction is indicated by the broken line $j^{44}$, in Fig. 32. The wheels $j^{37}$ $j^{38}$, are conveniently supported by the same portion, $j^{45}$, of the frame work which sustains the parts used in feeding the barb wire.

*The barb-forming mechanism.*—In this connection reference is had more especially to Figs. 12 to 30, and 46 to 56. The barb wire, from which are cut the lengths from which the barbs are made, is fed downward through the eyelet K, Figs. 12, 22, and in a plane somewhat at one side of that in which the stand wire to which the barbs and shields are applied moves across the machine. The eyelet referred to is suitably, and adjustably, (as by bolting it as shown,) secured to a block $a^2$, which, by means of suitable bolts, $a^3$, is secured to the bed plate, $a'$, of the machine. This block also serves as a holder and guide for the female part of the staple former, said part having a movement in a longitudinal direction therein, as more particularly hereinafter explained and which is in a direction which crosses the position in which the barb wire is held as the barb-length is cut off. L represents the knife for shearing the barb length from the main portion of the barb wire. It is attached to a suitable shank, $l$, and it is held and adapted to be moved longitudinally (that is, transversely in the machine) in a block $a^4$, which is secured to the bed plate of the machine. This knife coacts with a complemental, stationary, knife, $l'$, which is suitably secured to the frame work of the machine, and preferably by holding it in the extension $a^5$, of the block $a^2$, substantially as shown. That is, the inner end, $l^2$, of the stationary knife serves as a shoulder to support the main portion of the barb wire, and the cutting edges, $l^3$ and $l^4$, of the two knives respectively are relatively arranged, and also in time substantially as shown to enable the knives, as the movable knife moves from its position of Fig. 46, into its position of Fig. 47, to cut the barb-length, G', off. The next step after cutting the barb-length off is to shape the barb-length into the form of a staple, $G^2$, such as shown substantially in Fig. 49. This is accomplished as follows: M represents the male part of the staple-forming device. M' represents the female part of the staple-former. Said last named part, M', also serves, as hereinafter explained, as the means for cutting the shields from the shield-strip. For the purpose of forming the staple the part M' is slotted, recessed, or otherwise suitably chambered, to receive the barb-length as it is forced into the part to form it into the staple in question, and also to admit the part M or whatever means is employed to force the barb-length into the part M'. The preferred form of the part M' is exhibited, as also is that of the part M, although I desire not to be restricted to the particular forms shown in carrying out my improvement. The recess in question in the present instance takes the form of a slot, $m$, extending longitudinally in the part M', and also laterally to enable the barb length to be introduced into the part from the outer end thereof and the male part of the former to enter both at the end and the side of the part M'. The parts, $m'$, $m^2$, of the part M' are each grooved in their inner faces, substantially as shown at $m^3$, to receive the portions, $g^{23}$ of the staple, $G^2$, as it is being formed. The part M' is also perforated longitudinally throughout its length, substantially as shown at $m^4$ in Fig. 23, to receive and provide for the operation of a part termed the staple-ejector N, which is substantially a rod fitted to be moved longitudinally within the part M', receding to provide room for the admission of the barb-length as it is being formed into the staple, and moving in the opposite direction to eject the staple from the part M', at the proper time, as hereinafter explained.

The parts which effect the operation of the barb wire knife L, the staple-former parts M M', and the ejector N, are as follows: the main shaft B is provided with a cam $l^5$, having a groove $l^6$ in which engages, suitably as shown, the arm $l^7$, of a lever $l^8$, which is pivoted at $l^9$ to the frame of the machine, and having an arm $l^{10}$, which at $l^{11}$, is jointed to a lug $l^{12}$, which is attached to or forms part of the head $l^{13}$, which carries the knife L. The rotation of the shaft B thus causes the lever $l^8$, to be vibrated as indicated by its two positions shown respectively in the full and in the broken lines, in Fig. 18, and the knife L is thereby moved in a reciprocating manner to effect the desired cutting of the barb wire. By means of a suitable screw $l^{14}$, which works in the head $l^{13}$, and is connected with the knife, the knife can be adjusted suitably with reference to the co-acting knife $l'$, and the work it has to perform. The movement of the part, M, of the staple former is also accomplished by means of the movement just described; that is, the head $l^{13}$, carries a shoulder, $l^{15}$ which, in the forward movement of the knife L, encounters the staple-former part M, substantially as is indicated in Figs. 12, 22. Said part M is pivoted at $m^5$ to a suitable support $m^6$ to enable the part to be moved substantially as is indicated by its two positions shown respectively in the full and in the broken lines in Fig. 12. As the knife L and its head move forward toward the barb wire the former part M is thereby moved into its broken line position and the free end, $m^7$ of the former part enters the slot in the other former part M'. The movement of the knife L with relation to the described movement of the former part M is such as to enable the knife to encounter and shear off the barb length at or about the time the former part M encounters the barb wire, and by the continued forward movement of the knife head the former part is caused to turn farther around on its pivot and thereby cause the barb-length G', Fig. 47, to be carried into the former part M' and the staple, $G^2$, thereby formed out of the barb length. The knife L is withdrawn by reason of the positive action of the cam $l^5$ in its continued rotation. The former part M is withdrawn from the other former part M' by means of an arm O which, by means of the lug $o$, is attached to or forms part of the former-part M', and which in the forward movement of the part M' encounters the part M and thereby causes it to be turned backward on its pivot and withdrawn from the part M'. The roller, $m^8$, upon the part M forms a suitable bearing for the arm O. The former part M' is actuated by means of the cam $m^9$ which is attached to the main shaft B to rotate therewith. The cam is grooved at $m^{10}$, and engaging therein is the arm $m^{11}$ of a slide $m^{12}$ which is adapted to be moved longitudinally in or upon the bed plate of the machine. The arm extends upward and is secured at $m^{13}$ to the part M', and the slide and parts are thereby moved longitudinally in the machine by means of the rotation of the shaft B. The arm $m^{11}$ is provided with a pin or projection $m^{14}$, which, in the movement of the slide $m^{12}$ to effect the movement of the part M', withdraws from the arm $f'$ of the jaw, F, which serves to bind the strand wire at times when it is desirable to hold the wire fixed in the machine, and allows a spring, $f^2$, Fig. 2 to act to turn the jaw into position to grip the strand wire. When the slide $m^{12}$ moves in the opposite direction it encounters the arm $f'$ and overcomes the action of the spring, and the jaw releases the strand wire. The ejector, N, is operated by means of the cam, $n$, which is fastened to the shaft B. An arm, $n'$, engages in the groove $n^2$ of the cam and thereby causes said arm $n'$ to turn; said arm is attached to an upright shaft $n^3$ held and adapted to be rotated in bearings $n^4$, upon the frame work of the machine, and having secured to it another arm, $n^5$, which by means of a link, $n^6$, is jointed at $n^7$ to a sleeve $n^8$, Fig. 23, which is fastened to the ejector N. The rotation of the cam, $n$, therefore causes the ejector, and at the proper times, to move outward to eject the staple and then to be withdrawn to provide for the admission into the part M' of another staple.

In Fig. 23 at $n^9$ is shown provision for adjusting the ejector; that is, the sleeve $n^8$ by means of the nuts $n^9$, $n^{10}$, can be adjusted longitudinally upon the ejector. The shoulder, $l^{15}$, upon the knife head $l^{13}$, is also made adjustable by means of the screw $l^{16}$, (see Fig. 27) said screw working as indicated in the head $l^{13}$, and by turning the screw forward and backward said shoulder can be adjusted upon the head $l^{13}$ as may be desired so as to cause the former part M to be moved sooner or later in the stroke of the knife L, as may be required.

P represents the knife for cutting the shield lengths off the shields-strip I. This part coacts with the staple-former part M' whose forward end, $m^{15}$, is suitably constructed to serve as a knife and to coact with the knife P in shearing the strip. Said knife P, by means of any suitable nature, for instance the block $p$, (Figs. 12, 20, and 22,) is connected with the block $a^4$. The knife P is held in the block $p$, so as to bring its edge $p'$ opposite the top of the former part M' but suitably relatively arranged thereto for the two parts, P and M' to coact, in the movement of the part M', to shear the strip I. Said strip is fed downward through a guide, $i^5$, arranged between the blocks $p$ and $a^4$, and to enable the guide in question to be adjusted it is formed preferably of two movable parts $i^6$ which are adapted to be set closer together or farther apart from each other, and also as a set to be adjusted horizontally upon the block $p$, substantially as is indicated in Fig. 20. The knife P, at the lower end thereof comes behind the strip I and thus serves to support the main portion of the strip as the shield-length is cut off. The cutting off is accomplished by the forward movement of the part M'. The staple being formed, and the shield being ready to receive it, the staple and shield are connected with each other and with the strand wire, and the staple converted into a barb, as follows: Q (Figs. 15, 16, 12, and 13) represents the barb spreading and clinching device. This device consists principally of two parts, the part $q$ which serves to initiate the spreading of the parts $g^{23}$, $g^{23}$ of the staple and the part $q'$ which serves to further expand and finally clinch the staple parts upon the shield: $q^2$ represents a cam fastened to the shaft B and having a groove $q^3$ in which engages in its groove a lever $q^4$, pivoted at $q^5$ and connected at its upper end, $q^6$, with an arm $q^7$, Fig. 15, which carries the clincher $q'$. The rotation of the cam, $q^2$, therefore causes the arm $q^7$ to move reciprocally, and at the proper time for the work in question, toward and from the vicinity of the point at which the shield and staple are applied to the strand wire.

The spreader $q$ is adapted to slide upon the block $q^8$ which is attached to the bed-plate of the machine and which is suitably adapted to sustain the spreader in the following manner: the spreader is adapted to move toward and from the shield and staple as well as the clincher, and for this purpose, and as the most desirable method, the spreader, $q$, is slotted at $q^9$ to receive the bolts $q^{10}$, which pass through the slot and enter the block $q^8$. The spreader is moved outward, say by means of the spring $q^{11}$, and when thus pressed outward it is brought into position, as in Fig. 52, to open the staple parts apart from each other, and for this purpose the spreader is notched at $q^{12}$ to thereby properly hold the staple parts during the spreading operation. The spring, $q^{11}$, while strong enough to initiate the opening of the staple parts, yields however to the continued advancement of the staple-former part $M'$, and the staple partly expanded is thereby brought into contact with the larger clincher $q'$ which, at that time, by the action of the cam $q^2$, has been brought into position (Figs. 52 and 53), to form an abutment against which the staple parts, by the action of the former part $M'$, are forced, and by such forcing caused to be openly squared apart from each other and to be clinched upon the shield as shown in Figs. 53 to 56.

In operation, the strand wires are fed across the machine, that one, D, of them to which the barbs and shields are applied passing through the guide $e^{26}$ and thence along side the block $a^4$, and between the blocks $p$, $a^4$, passing the point $x$ Fig. 22 at which the barbs and shields are applied, thence between the blocks $a^4$ and the jaw F, and thence on to the opposite side of the machine at which point the other strand wire, $D'$, meets it and the two wires are twisted together by means of an ordinary twister, which is a separate machine and not here shown. Meanwhile the wire G from which the barbs are made is being fed downward through the feeding device shown in Figs. 31 to 36, and thence through the eyelet K to bring its lower end in front of the staple former part $M'$ and against the end of the stationary knife $l'$. At this time the part $M'$ meets the barb wire and the knife L approaches the barb wire; said last named part holds the former part M against the barb wire, aiding to steady it, and at or about the same time the knife L moves farther forward and in conjunction with the part $l'$ cutting a barb-length $G'$ of wire off from the main portion of the wire G. This last named position is indicated in Fig. 47. The knife L and the former part M remain stationary, the last named part being beneath the first named part meanwhile the former part $M'$ moves forward, bringing the parts $M'$ and M into their relative position shown substantially in Fig. 48; by means of this last described movement the barb-length of wire cut off has been shaped into the form of the staple shown substantially in Fig. 49; the knife L and the former part M now are moved backward and thereby withdrawn out of the path of the former part $M'$; that part, $M'$, continues to move forward holding the staple that is to form the barb; by means of this last described movement the forward end of the former part $M'$ has nearly or quite advanced to the path along which the shields-strip it being fed to meet the strand wire and staple; the ejector, N, now moves outward and forces the staple outward from the part $M'$, and in such movement the projecting portion of the staple is passed through the perforation in that shield-length which constitutes the lower end of the shields-strip; for previously to the described ejectment of the staple the shields strip has been fed downward between the strand wire and the barb-spreader and clincher; the movement of the staple causes its projecting portion to encounter the spreader, $q$, of the device Q and the parts $g^{23}$ of the staple are thereby opened apart from each other, substantially as is indicated in Fig. 52; the part $q$ is elastically or yieldingly supported by the spring $q^{11}$; the part $M'$ continues to advance and the clincher $q'$ of the device Q moves toward the part $M'$; the shield-length is thereby sheared from the main portion of the shield-strip, the spreader $q$ is forced backward, and the clincher $q'$ encounters the partially opened staple-parts and said parts $g^{23}$ are thereby fully opened apart from each other and clinched upon the shield, substantially as is represented in Fig. 53. The former part $M'$, the ejector N, and the barb-clincher $q'$ are now withdrawn in their respective directions leaving the strand wire and attached shield and barb $G^3$ free to pass on toward the twister a distance equal to that at which it is desired to space the barbs apart, whereupon the strand wire to which the barb and shield have been applied is again, by the action of the jaw F, gripped between that part and the block $a^4$ and the operation of attaching another barb and shield is repeated, and so on, arresting the strand wire D in its movement at regular intervals to enable the barbs and shields to be applied thereto and then releasing the strand wire to enable it to move along. Meanwhile the shield-strip continues to be intermittently fed, in the manner described, to cause the shield-length to be brought into position against the strand wire and between the former part $M'$ and the knife P at each forward movement of the described parts for applying a shield and barb. The twister is supposed to be of the usual form, exerting a yielding tension which accommodates the intermittent movement of the strand-wires.

The preferable mode of constructing the strand-wire feed rolls is indicated in Figs. 10 and 11. Said rolls are composite, the rim $e^{31}$ having a tapering perforation adapted to fit a conical hub $e^{30}$, and held thereon by means of the plate $e^{33}$ which is secured say by means of the screws $e^{35}$ to the hub and having its peripheral portion lapping upon the rim, substantially as shown. This construction is analogous to that of ratchets $j^{25}$ above described.

Fig. 36 exhibits a tension device for the shields-strip feeding shaft. It consists substantially of two parts, $j^{46}$ and $j^{46a}$, which, at one end thereof, bind upon the frame work $j^{48}$, and at the other end thereof upon the shaft $j^{41}$, and drawn suitably together, to exert the desired tension upon the shaft, by means of the bolt $j^{47}$. The shoulder $l^{15}$, is secured by means of the bolt $l^{15a}$ (Fig. 28), and the shoulder is slotted to receive the bolt to provide for the longitudinal adjustment of the shoulder. The head $l^{13}$ is conveniently secured to the block $a^4$ by means of the keeper $a^{44}$, substantially as shown.

I claim—

1. In a barbing machine, the combination of the staple former parts and the staple ejector, one of said former parts being perforated longitudinally for the passage of the ejector and also open at the side thereof, and the other of said former parts being pivoted to swing and engage the first mentioned former part, substantially as described.

2. In a barbing machine, the combination with knives for shearing the barb wire, and a staple former part contiguous thereto and supporting the wire while being cut, said former part having a cutting edge, of a co-acting knife to shear the shield-lengths, substantially as described.

3. In a barbing machine, the combination of the staple-former part M', the staple ejector, and the staple expander, said former part being perforated longitudinally, and said ejector adapted to reciprocate longitudinally in said former part, and the expander operating in line with and against the ejector, substantially as described.

4. In a barbing machine, the combination of the staple former part M', the staple ejector adapted to reciprocate longitudinally in said former part, the staple expander, and the clincher, movable longitudinally on said expander, substantially as described.

5. In a barbing machine, the combination with barb cutting knives, of the staple former parts, the one supporting the barb wire, while being cut, and recessed to shape the staple, the other having a swinging movement into engagement therewith, a cutter for the shield lengths coacting with the first-named former part, and means for securing the staple to the shield lengths, substantially as described.

6. In a barbing machine, the combination of the slotted and grooved staple former part, with the coacting staple former part, said first named former part having a longitudinal movement, and said coacting former part having a swinging movement to force the barb into the grooved slot, substantially as described.

7. In a barbing machine, the combination with the longitudinally moving slotted staple former part, and the swinging former part adapted to engage the wire in front thereof and force it into the slot, of the reciprocating knife which cuts the barb wire supported by the slotted staple former and supports the swinging former, as set forth.

8. In a wire barbing machine, the combination with the knife L, of the swinging staple former part, the longitudinally moving slotted staple former part, and the arm for withdrawing the movable staple former part from the slotted former part, substantially as described.

9. In a wire barbing machine, the combination of the supporting block $a^4$, and the block $p$, carried by the same, the shield-strip guide between said blocks, and the shield-shearing knife, and the former block M' having a cutting edge to co-operate with the knife, substantially as described.

10. In a wire barbing machine, the combination of the supporting block $a^4$, a shield strip guide thereon, and the movable jaw for gripping the strand wire against the block $a^4$, as the barb and shield are being applied thereto, together with means for attaching these parts, substantially as described.

11. In a barbing machine, a gripping mechanism for the strand wire, consisting of a support $a^4$, a pivoted jaw F, a slide $m^{12}$ for opening the same, and a spring $f^2$ for closing the same, as set forth.

12. In a barbing machine, in combination with the co-operating mechanism, the pivoted adjustable strand wire guide $e^{26}$, having its arm $e^{28}$ elastically held, substantially as and for the purposes described.

13. In a barbing machine, the combination of the knife L, its supporting block or head $l^{13}$, and the shoulder $l^{15}$, reciprocating on said block, said knife being adjustable in said block, and a set screw carried in the shoulder for fixing the adjustment of the knife, substantially as described.

14. In a wire barbing machine, the herein described device for feeding the strand wires, consisting of the standards $e^9$, $e^{10}$, the feed rolls $e^3$, $e^4$, the arms $e^7$, $e^8$ attached to said standards, the posts $e^{11}$, $e^{14}$ for supporting said arms, the springs $e^{13}$ interposed between said arms, and the cam lever $e^{16}$ supported by the standards and engaging a spring for pressing together the feed rolls, substantially as described.

15. In a wire barbing machine, the feed roll $e^4$, having the conical hub, the rim tapered to fit said hub, the securing plate, and the screws for clamping the posts together, substantially as described.

Witness my hand this 15th day of February, 1892.

JOHN W. GOVIER.

Witnesses:
W. A. HOLLAND,
J. N. GRIFFITH.